United States Patent
Niang et al.

(10) Patent No.: US 9,405,025 B2
(45) Date of Patent: Aug. 2, 2016

(54) METHOD AND DEVICE FOR DETECTING FAULTS IN A MARINE SOURCE ARRAY

(71) Applicant: CGGVERITAS SERVICES SA, Massy (FR)

(72) Inventors: Cheikh Niang, Saint Cyr L'Ecole (FR); Risto Siliqi, Paris (FR); Yuan Ni, Antony (FR)

(73) Assignee: CGG SERVICES SA, Massy (FR)

( * ) Notice: Subject to any disclaimer, the term of this patent is extended or adjusted under 35 U.S.C. 154(b) by 602 days.

(21) Appl. No.: 13/766,157

(22) Filed: Feb. 13, 2013

(65) Prior Publication Data

US 2013/0258808 A1    Oct. 3, 2013

Related U.S. Application Data

(60) Provisional application No. 61/619,003, filed on Apr. 2, 2012.

(51) Int. Cl.
*G01V 1/137* (2006.01)
*G01V 1/38* (2006.01)

(52) U.S. Cl.
CPC ..... *G01V 1/137* (2013.01); *G01V 1/38* (2013.01); *G01V 1/3835* (2013.01); *G01V 2200/14* (2013.01)

(58) Field of Classification Search
CPC ....... G01V 1/38; G01V 1/137; G01V 1/3835; G01V 2200/14
USPC ......................................................... 367/23
See application file for complete search history.

(56) References Cited

U.S. PATENT DOCUMENTS

| 4,476,553 A | 10/1984 | Ziolkowski et al. |
| 2007/0258322 A1 | 11/2007 | Hopperstad |
| 2011/0149683 A1 | 6/2011 | Lunde et al. |

FOREIGN PATENT DOCUMENTS

EP    2 322 955 A2    5/2011

OTHER PUBLICATIONS

Australian Patent Examination Report No. 1 issued Feb. 12, 2014, in related Australian Patent Application No. 2013202657.
Ziolkowski et al., "The Signature of an Air Gun Array: Computation From Near-Field Measurements Including Interactions," Geophysics, vol. 47 No. 10 Oct. 1982 pp. 1413-1421.
Office Action mailed Mar. 13, 2015 in related AU Application No. 2013202657.
Office Action mailed Mar. 27, 2015 in related MX Application No. MX/a/2013/003726.

*Primary Examiner* — Daniel L Murphy
(74) *Attorney, Agent, or Firm* — Patent Portfolio Builders PLLC

(57) ABSTRACT

A method for detecting faults of individual wave sources in a marine source array includes acquiring near-field data using sensors, the sensors being located near the individual wave sources. The method further includes generating an index for each of the individual wave sources based on (A) the near-field data and (B) information on the geometry of the marine source array that enables localizing the individual wave sources and respective sensors relative to one another. The method also includes comparing the index for each of the individual wave sources with a corresponding reference index for determining whether a fault has occurred.

20 Claims, 8 Drawing Sheets

Starboard Source

Port Source

METHOD AND DEVICE FOR DETECTING FAULTS IN A MARINE SOURCE ARRAY

CROSS REFERENCE TO RELATED APPLICATIONS

This application claims priority and benefit from U.S. Provisional Patent Application No. 61/619,003, filed Apr. 2, 2012, for "Method for Detecting Air Gun Faults in a Marine Source Array," the entire content of which is incorporated in its entirety herein by reference.

BACKGROUND

1. Technical Field

Embodiments of the subject matter disclosed herein generally relate to methods and devices for determining a fault (such as a delay or an air leak in an air gun) of individual pressure wave sources of a marine source array based on near-field data acquired by pressure sensors placed near each of the individual pressure wave sources.

2. Discussion of the Background

Since offshore drilling is an expensive process, those undertaking it need to know where to drill in order to avoid a dry well. Marine seismic surveys acquire and process data to generate a profile (image) of the geophysical structure under the seafloor. While this profile does not provide an accurate location for oil and gas, it suggests, to those trained in the field, the presence or absence of oil and/or gas.

During a seismic survey, a vessel tows a seismic wave source and detectors (wave receivers) located on streamers. Reflections of the source-calculated waves are recorded by detectors. The waves are reflected from interfaces between layers, when the density and the wave velocity change (e.g., at an interface between water and air, water to rock, shale to sand, etc).

A popular seismic wave source is the air gun. An air gun stores compressed air and releases it suddenly underwater when fired. The released air forms a bubble (which may be considered spherical), with air pressure inside the bubble initially greatly exceeding the hydrostatic pressure in the surrounding water. The bubble expands, displacing the water and causing a pressure disturbance that travels through the water. As the bubble expands, the pressure decreases, eventually becoming lower than the hydrostatic pressure. When the pressure becomes lower than the hydrostatic pressure, the bubble begins to contract until the pressure inside again becomes larger than the hydrostatic pressure. The process of expansion and contraction may continue through many cycles, thereby generating a pressure (i.e., seismic) wave. The pressure variation generated in the water by a single source (which can be measured using a hydrophone or geophone located near the air gun) as a function of time is called the air gun signature and is illustrated in FIG. 1. A first pressure increase due to the released air is called primary pulse and it is followed by a pressure drop known as a ghost. Between highest primary pressure and lowest ghost pressure there is a peak pressure variation (P-P). The pulses following the primary and the ghost are known as a bubble pulse train. The pressure difference between the second pair of high and low pressures is a bubble pressure variation $P_b$-$P_b$. The time T between pulses is the bubble period. A parameter evaluated based on the signature is the peak-to-bubble ratio, which is P-P/$P_b$-$P_b$.

Single air guns are not practical because they do not produce enough energy to penetrate at desired depths under the seafloor, and plural weak oscillations (i.e., the bubble pulse train) following the primary (first) pulse complicates seismic data processing. These problems are overcome by using arrays of air guns, generating a larger amplitude primary pulse and canceling secondary individual pulses by destructive interference.

FIG. 1 represents a situation in which the bubble generated by a single air gun drifts slowly toward the surface, surrounded by water having the hydrostatic pressure constant or slowly varying as the bubble slowly drifts upward. However, when another air gun is fired simultaneously in proximity to the first air gun, the hydrostatic pressure is no longer constant or slowly varying. The bubbles of neighboring guns affect each other.

A source array includes plural individual wave sources. An individual wave source may be an air gun or a cluster of air guns. Since the dimensions of the source array, including plural individual sources, are comparable with the wavelengths of generated wave, the wave generated by the source array is directional, i.e., the shape of the wave, or the signature varies with the direction until, at a great enough distance, the wave starts having a stable shape. After the shape become stable, the amplitude of the wave decreases inversely proportional to the distance. The region where the signature shape no longer changes significantly with distance is known as the "far-field," in contrast to the "near-field" region where the shape varies. Knowledge of the wave source's far-field signature is desirable in order to extract information about the geological structure generating the detected wave upon receiving the far-field input wave.

In order to estimate the source array's far-field signature, an equivalent notional signature for each individual source may be calculated for each of the guns using near-field measurements (see e.g., U.S. Pat. No. 4,476,553 incorporated herewith by reference). The equivalent notional signature is a representation of amplitude due to an individual wave source as a function of time, the source array's far-field signature being a superposition of the notional signatures corresponding to each of the individual sources. In other words, the equivalent notional signature is a tool for representing the contribution of an individual source to the far-field signature, such that the individual source contribution is decoupled from contributions of other individual wave sources in the source array.

However, the stability and reliability of the far-field signature depends on the stability of each of the individual wave sources and of the source array's geometry. During a seismic survey, the individual wave sources' behavior may change (e.g., firing later or earlier than expected, than desirable, or at a smaller amplitude than nominally designed) and thus affect the far-field source signature.

It would be desirable to have methods and apparatuses capable of identifying faults of individual wave sources of a marine source array in order to enable the operator to make an informed decision or implement corrective actions during a marine seismic survey.

SUMMARY

Embodiments of the present inventive concept allow identifying faults of individual wave sources of a marine source array based on the near-field data. These embodiments enable an operator to make informed decisions or to implement corrective actions related to the individual wave sources of a marine source array.

According to one exemplary embodiment, there is a method for detecting faults of individual wave sources in a marine source array. The method includes acquiring near-field data using sensors, the sensors being located near the individual wave sources. The method further includes generating an index for each of the individual wave sources based on (A) the near-field data and (B) information on geometry of the marine source array that enables localizing the individual wave sources and respective sensors relative to one another. The method also includes comparing the index for each of the individual wave sources with a corresponding reference index for determining whether a fault has occurred.

According to another exemplary embodiment, there is a marine source array evaluation apparatus configured to analyze data related to a marine source array, including individual pressure wave sources configured to generate waves underwater, and sensors associated with the individual wave sources configured to acquire near-field data related to the waves generated by the individual wave sources, the sensors being placed near the individual wave sources. The apparatus includes a near-field data processing unit configured to generate an index for each of the individual wave sources based on (A) the near-field data and (B) information on geometry of the marine source array that enables localizing (i) the individual wave sources and (ii) respective sensors relative to one another. The near-field data processing unit is further configured to compare the index for each of the individual wave sources with a corresponding reference index for determining whether a fault has occurred.

According to another exemplary embodiment, there is a computer readable media non-transitorily storing executable codes which when executed on a computer make the computer perform a method for detecting individual source faults in a marine source array. The method includes acquiring near-field data using sensors, the sensors being located near the individual wave sources. The method further includes generating an index for each of the individual wave sources based on (A) the near-field data and (B) information on geometry of the marine source array that enables localizing the individual wave sources and respective sensors relative to one another. The method also includes comparing the index for each of the individual wave sources with a corresponding reference index for determining whether a fault has occurred.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic marine source array. However, the embodiments to be discussed next are not limited to these structures, but may be applied to other source arrays.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
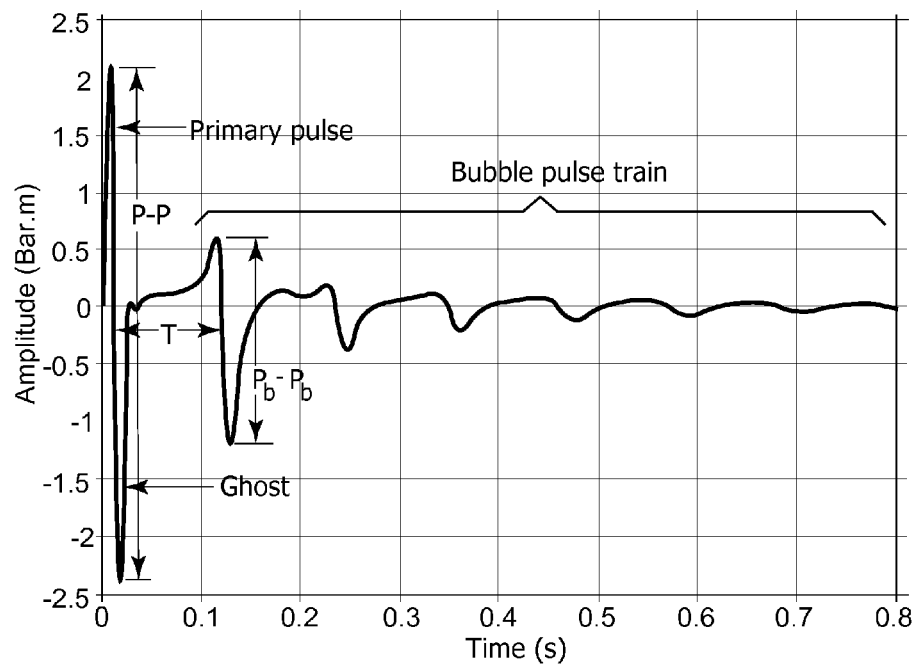
FIG. 1 is a graph illustrating pressure variation in time when a gun fires.
Figure 2:
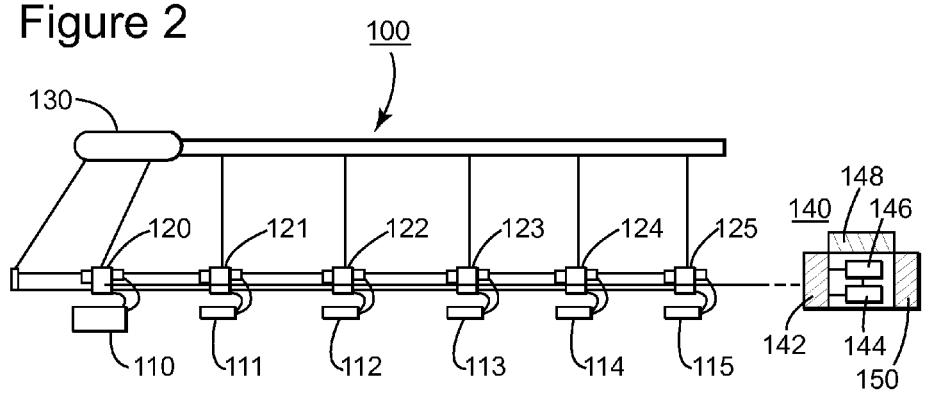
FIG. 2 illustrates a marine source array and a seismic data processing unit according to an exemplary embodiment.

FIG. 2 illustrates a marine source array 100 including individual sources 110, 111, 112, 113, 114, 115 and sensors 120, 121, 122, 123, 124, 125 located near (above) the individual sources 110-115, respectively. The sensors 120-125 may be hydrophones or geophones. The number and arrangement of the individual sources are merely exemplary and are not intended to be limiting. Each of the individual wave sources 110-115 may be a single air gun or a cluster of air guns. The sensors 120-125 may be at about 1 m above the individual wave sources 110-115. The distance in-between neighboring individual wave sources may be about 3 m. The marine source array 100 may include also a soft float 130.

The sensors 120-125 are connected to a seismic data processing unit 140 (e.g., located on the towing vessel), including an interface 142, a processor 144 and a memory 146. The seismic data processing unit 140 may also include a monitoring unit 148 and a display 150.

The interface 142 receives the near-field seismic data from the sensors 120-125 and provides this data to the processor 144 and/or stores the data in the memory 146. The processor 144 is configured to generate an index for each of the individual wave sources based on (A) the near-field data and (B) information on the geometry of the marine source array that enables localizing (i) the individual wave sources and (ii) respective sensors relative to one another. The information about the geometry of the marine source array 100 may be based on nominal values stored in the memory 146 and updated by the processor 144 based on current position indications. For example, the current position indications may be received or inferred based on acoustic equipment, GPS equipment and/or the near-field seismic data.

The memory 146 may store information recorded prior to performing the seismic survey. For example, the memory 146 may store results of a bubble test that allows determination of the wave reflection coefficient at the water surface as a function of the incident angle.

Additionally, the processor 144 may determine characteristics of filters associated with the sensors 120-125. These filters are used to compensate for inherent differences between the sensors related to amplitude, phase, hardware, etc. The characteristics of these filters may be determined based on a comparison between the near-field signatures on the individual wave sources which were recorded during bubble tests. The purpose of the bubble test is to verify that each individual source of a source array performs at nominal values. During the bubble test, the correct pressure, tow depth, timing and volume of each individual gun are verified.

The far-field signature of the source array 100 may be unstable because of horizontal and vertical geometry variations due to the waves and currents. The signature of the air gun source array 100 is evaluated for positions substantially vertically underneath the air gun source array 100.

The far-field signature may also be unstable when notch locations (where the wave traveling directly from the source and the water-surface-reflected wave interfere destructively, canceling each other) fluctuate due to the time variation of the thickness of the water layer between the source and the surface and angle dependency of the reflection coefficient.

The signature of the air gun source array 100 may be also unstable due to delays or faults of the individual sources, for example when the sources do not fire at the same time. Conventional methods of determining the far-field signature of a source array are not configured to take into consideration the above-discussed causes of far-field signature instability.

The processor 144 is configured to perform methods for detecting faults of individual wave sources in a marine source array. The processor 144 may perform these methods using executable codes stored in the memory 146 or in other computer-readable storage media.

Figure 3:
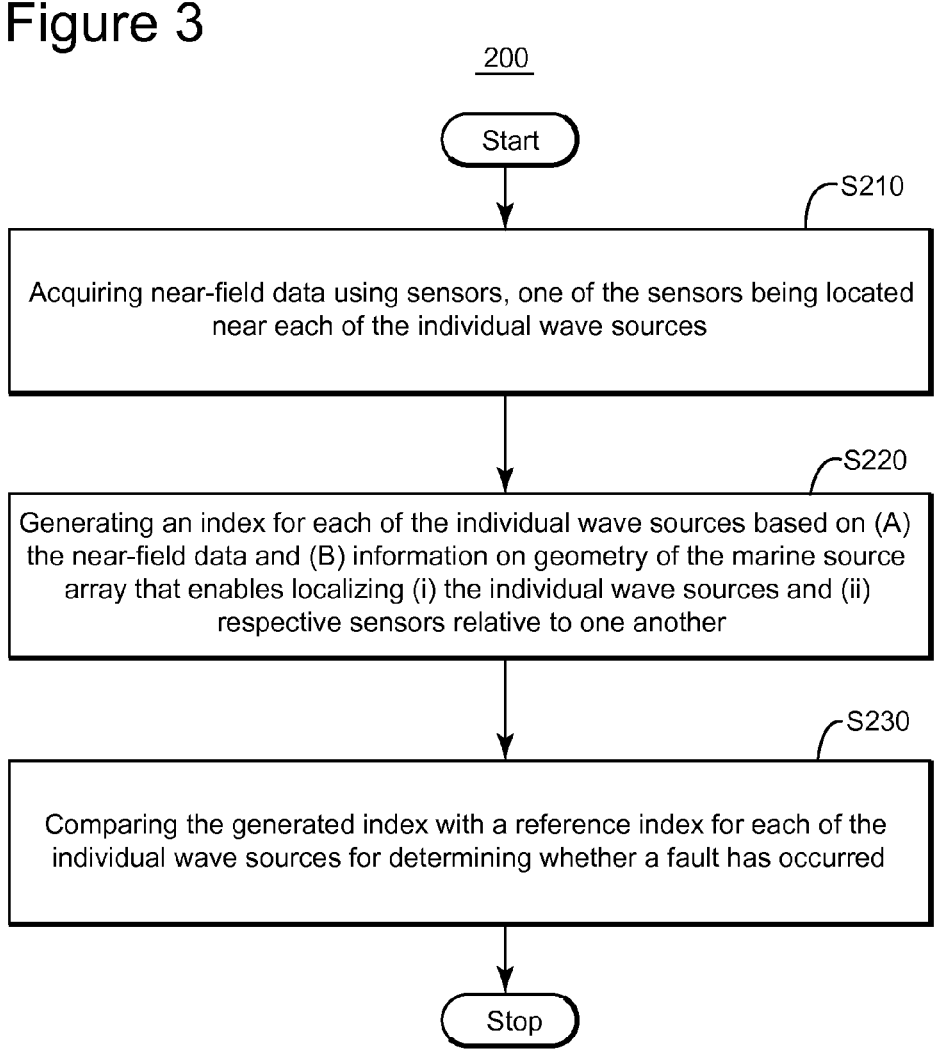
FIG. 3 is a flowchart illustrating steps performed by a method for detecting faults of individual wave sources in a marine source array, according to an exemplary embodiment.

A flowchart illustrating steps performed by a method 200 according to an exemplary embodiment is illustrated in FIG. 3. The method 200 includes acquiring near-field data using sensors (one of the sensors being located near each individual wave source), at S210.

Further, the method 200 includes generating an index for each of the individual wave sources based on (A) the near-field data and (B) information on the geometry of the marine source array, at S220. This information enables localizing (i) the individual wave sources and (ii) respective sensors relative to one another.

The method 200 also includes comparing the generated index with a reference index for each of the individual wave sources for determining whether a fault has occurred, at S230.

Generating the index for each individual wave source may include determining an equivalent notional signature for each of the individual wave sources and extracting the index based on an inverse of the equivalent notional signature. The term "inverse of a notional" indicates that the notional is retrieved from near-field data using an inversion method.

In determining the equivalent notional signatures, one or more of the following assumptions are used:
  each of the individual wave sources has an equivalent notional signature that propagates spherically;
  equivalent notional signatures of air guns in a cluster are identical;
  an equivalent notional signature of an individual wave source that is not firing is null; and
  a reflection coefficient of a wave at the water surface is a function of an incident angle, the function being measured and calculated during a bubble test.

Figure 4:
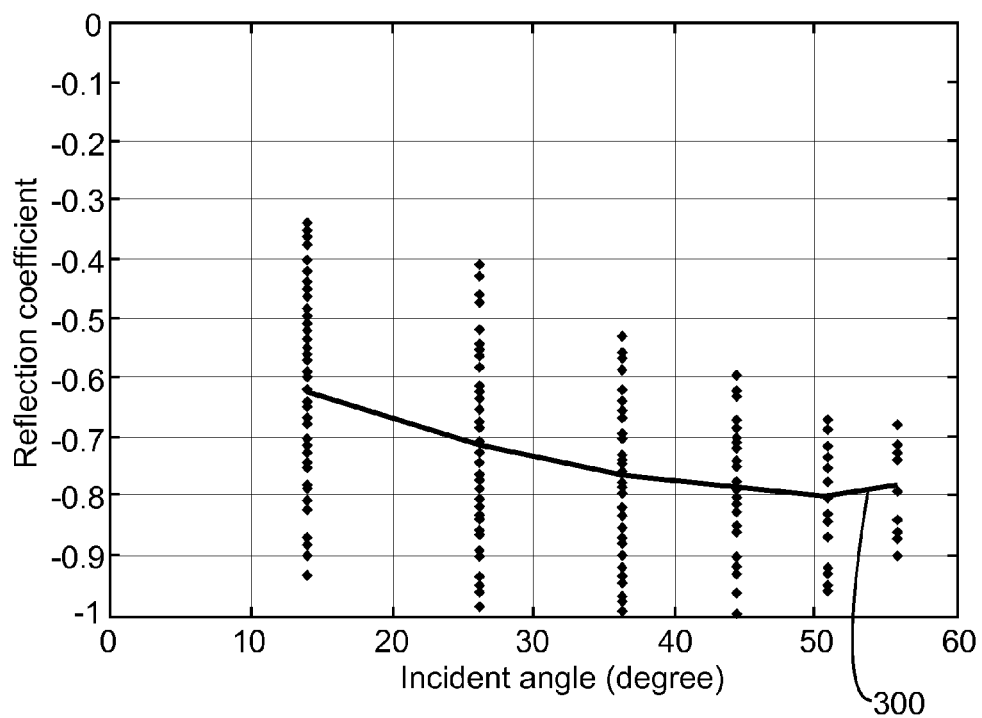
FIG. 4 is a graph exemplarily illustrating angular dependence of the reflection coefficient used in one embodiment.

An exemplary embodiment of the reflection coefficient as a function of the incident angle is illustrated in FIG. 4. The reflection coefficient is one of the parameters used in the inversion algorithm. Unlike in the conventional approach in which this reflection coefficient is assumed constant and equal with −1 (i.e., the "dipole" or "mirror image" approach), methods according to various embodiments use a more realistic approach, taking into consideration the incident angle dependence of the water to air reflection coefficient. For example, in FIG. 4, line 300 represents a function obtained by interpolating averages of measured or calculated reflection coefficient values, as determined during bubble tests. Another functional fit may be used instead of interpolation.

In order to properly take into consideration the geometry of the source at the time data is acquired, nominal design values may be altered based on information acquired using acoustic equipment or GPS equipment, or even using the near-field data. For example, the dynamic gun positions may be estimated by inversion of near-field hydrophone records.

Figure 5A:
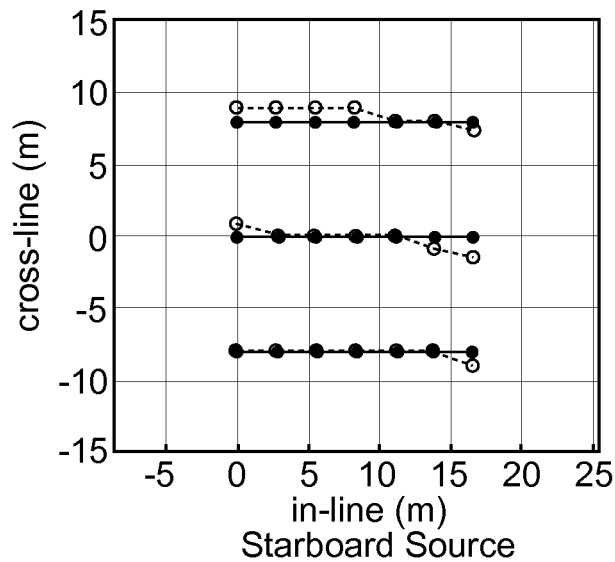
FIGS. 5A and 5B illustrate nominal design values of individual wave source positions (squares) for two separate source sub-arrays and wave source positions (stars) as estimated using the near-field data.
Figure 5B:
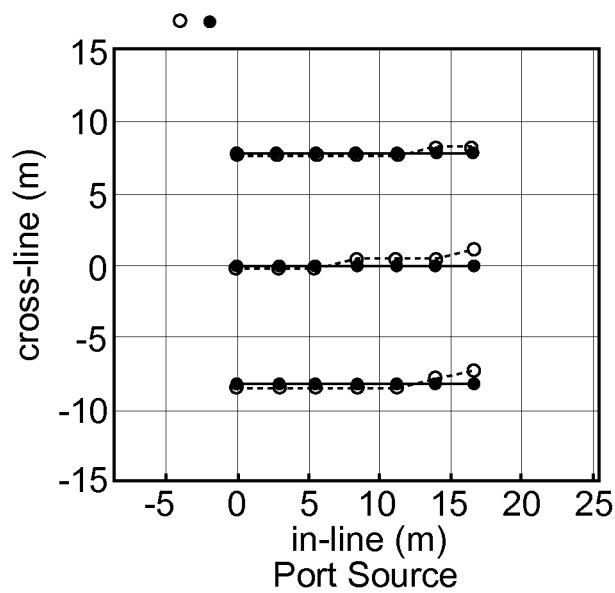

FIGS. 5A and 5B illustrate nominal design values of individual wave source positions (the full black circles) for two separate source sub-arrays and wave source positions (the white circles) as estimated using the near-field data. The source sub-arrays are labeled as starboard source and port source. These source sub-arrays may be fired simultaneously or sequentially. The "in-line" direction corresponds to the towing direction, and the "cross-line" corresponds to a direction perpendicular to the towing direction. The individual source position precision achieved by determining the actual position using near-field data is significantly better (~0.2 m) than when using nominal values or even GPS equipment (2-3 m precision).

The index generated for each individual wave source from the inverse notional signature may be an arrival time of a first peak, a spectrum, a phase, a peak-to-bubble ratio, and a bubble period.

Figure 6:
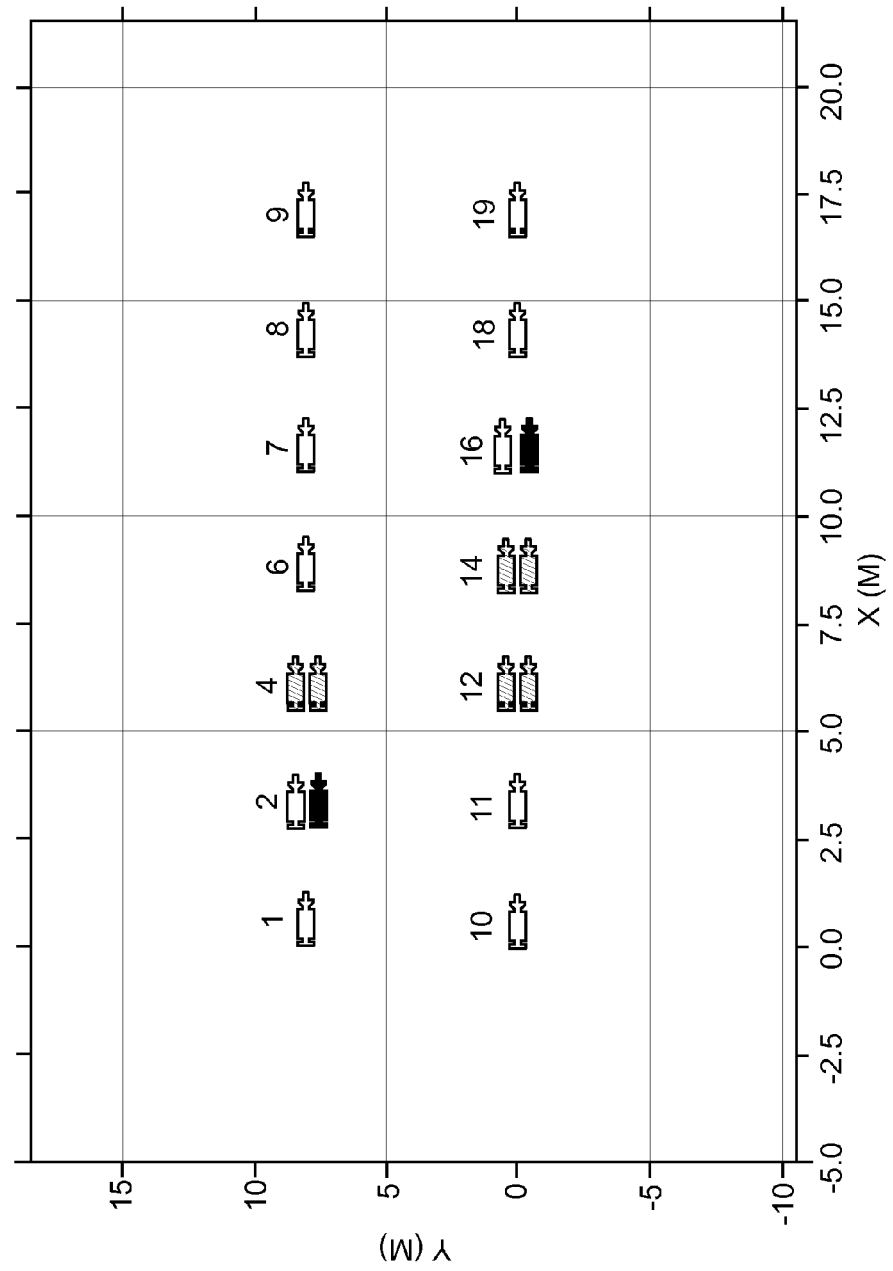
FIG. 6 illustrates a gun source array used for testing a method according to an exemplary embodiment.

A delay in firing one of the individual wave sources is detected when the position of the first peak of the inverted notional signature of the individual wave source significantly departs from a reference value thereof. For example, FIG. 6 illustrates a gun source array used for testing a method according to an exemplary embodiment. The total volume of this source is about 3,500 cubic inches. The white icons represent an individual wave source including a single air gun, the black icons correspond to inactive air guns, and the grey icons correspond to a cluster of air guns. The x-axis is "in-line" with the towing direction, and the y-axis is a direction perpendicular to the towing direction.

Figure 7:
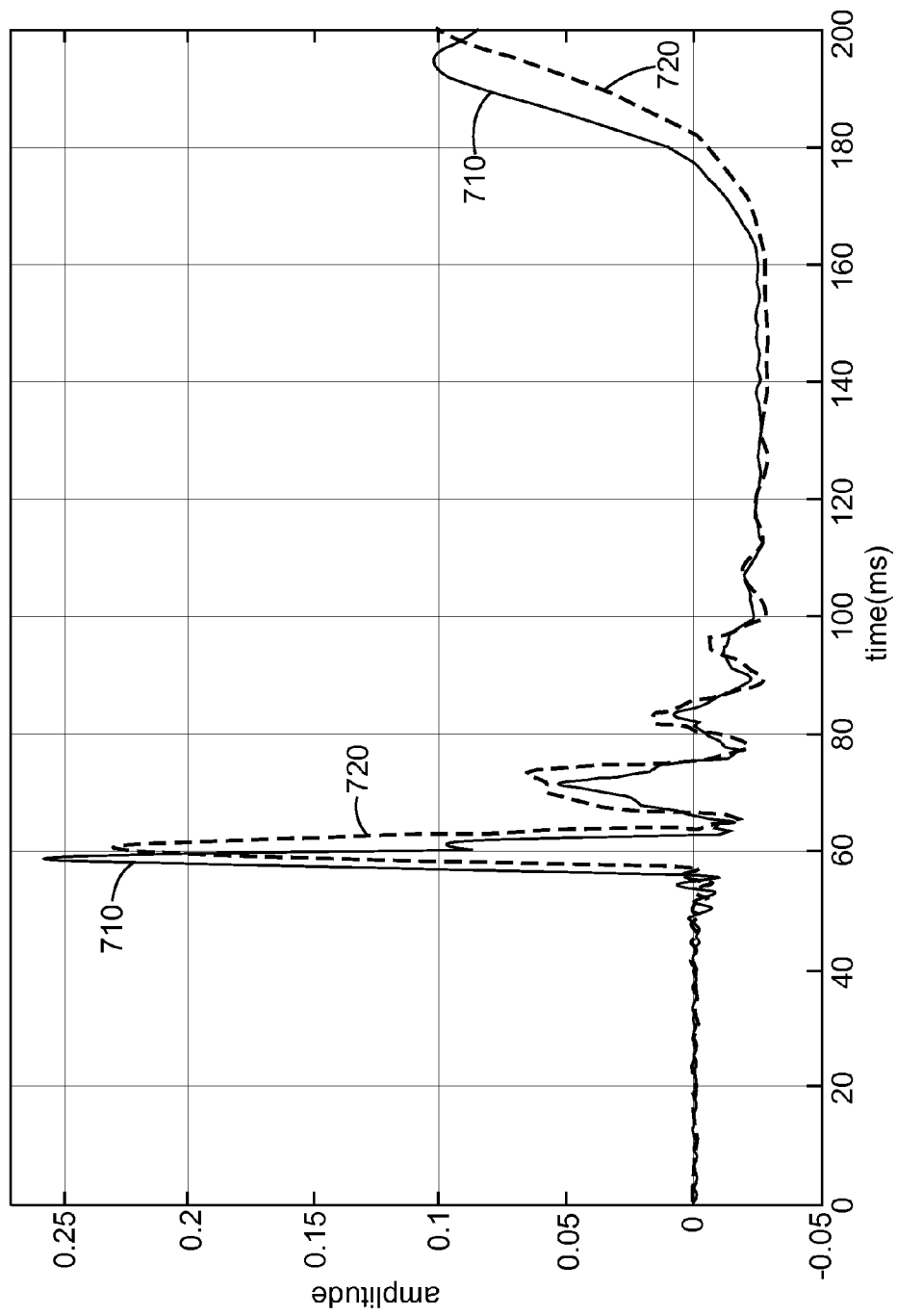
FIG. 7 is the inverted notional for a normal situation and for a situation in which some of the individual wave sources were intentionally delayed.
Figure 8:
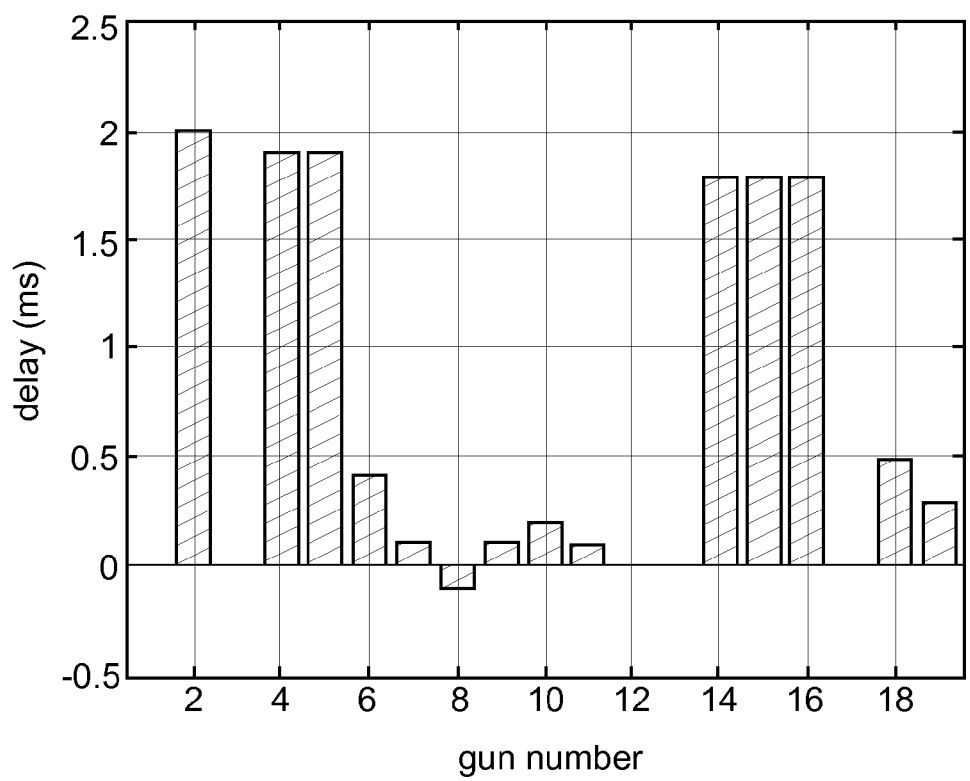
FIG. 8 illustrates the delays of individual wave sources obtained for the situation in which some of the individual wave sources were intentionally delayed.

FIG. 7 is a graph illustrating amplitude of pressure versus time due to a source array fired for two situations: the continuous line 710 corresponds to the inverted notional for a normal situation (when the guns are fired simultaneously), and the dashed line 720 corresponds to a situation in which guns 2, 4, 5, 14, 15 and 16 in FIG. 6 are delayed about 2 ms. An arrival time of the first peak for each individual wave source is determined based on the near-field data and information on geometry of the marine source array in the second situation. FIG. 8 illustrates the delay versus gun number obtained by applying this method according to an embodiment. Thus, the 2 ms delays of guns 2, 4, 5, 14, 15 and 16 were correctly identified.

An air leak of air gun may be detected when a bubble period of the inverted notional signature of the individual wave source significantly departs from a reference value thereof.

As previously mentioned and illustrated in FIG. 2, a monitoring unit 148 may be included in the seismic data processing unit 140 and be connected to the processor 144. This monitoring unit 148 may be configured to monitor the evolution of the index for each of the individual sources and to signal when a difference between the generated index and the reference index exceeds a predetermined index threshold difference.

The seismic data processing unit 140 may also include a display 150 connected to the processor 144 and configured to display values of the index versus time for one or more of the individual wave sources.

Figure 9:
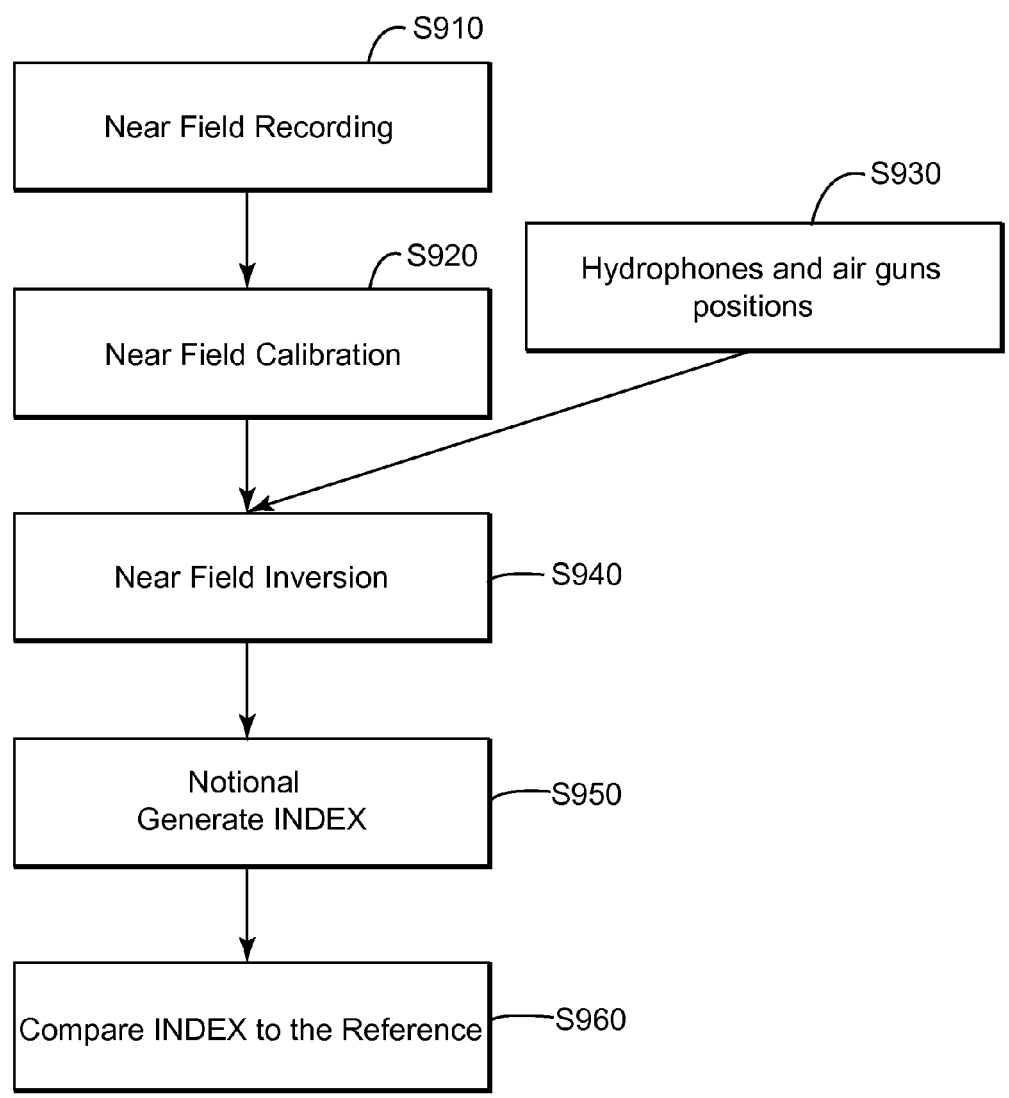
FIG. 9 is a data processing flow according to an exemplary embodiment.

FIG. 9 is a data processing flow according to another embodiment. At S910, the near-field data is recorded. Then, at S920, the near-field data is calibrated by applying filters to remove any bias due to the individual sensors (hydrophones). The actual hydrophones and air guns' positions are asserted at S930, using the near-field data itself or other information such as that provided by GPS or acoustic equipment.

At S940, near-field data inversion is performed to obtain notional signatures. Following the near-field data inversion, an index is generated for each air gun based on the respective notional signature at S950. Each index is then compared with a corresponding reference value at S960.

The disclosed exemplary embodiments provide methods and a system using near-field data to determine faults of individual wave sources of a marine source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may combine hardware and software aspects. The exemplary embodiments may take the form of a computer-readable storage medium non-transitorily storing executable codes (i.e., a computer program) which when executed on a computer perform the above-described methods. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for detecting faults of individual wave sources in a marine source array, the method comprising:
    acquiring near-field data using sensors, the sensors being located near the individual wave sources;
    generating an index for each of the individual wave sources based on (A) the near-field data and (B) information on geometry of the marine source array that enables localizing (i) the individual wave sources and (ii) respective sensors relative to one another; and
    comparing the index for each of the individual wave sources with a corresponding reference index for determining whether a fault has occurred;
    wherein the index comprises a spectrum and at least one of an arrival time of a first peak, a phase, a peak-to-bubble ratio and a bubble period.

2. The method of claim 1, wherein the pressure sensors are hydrophones.

3. The method of claim 1, wherein the individual wave sources are single air guns or clusters of air-guns.

4. The method of claim 1, wherein the generating of the index for each of the individual wave sources comprises:
    determining an equivalent notional signature for each of the individual wave sources; and
    extracting the index based on an inverse of the equivalent notional signature.

5. The method of claim 4, wherein one or more of the following assumptions for determining the equivalent notional signature for each of the individual wave sources:
    each of the individual wave sources has an equivalent notional signature that propagates spherically;
    equivalent notional signatures of air guns in a cluster are identical;
    an equivalent notional signature of an individual wave source that is not firing is null; and
    a reflection coefficient of a wave at a water surface is a function of an incident angle, the function being measured and calculated during a bubble test.

6. The method of claim 1, wherein the index comprises the spectrum and at least two of the arrival time of the first peak, the phase, the peak-to-bubble ratio, and the bubble period.

7. The method of claim 6, wherein the fault is a delay or an air leak.

8. The method of claim 1, further comprising:
    acquiring the information on the geometry of the marine source array using one or more of acoustic equipment, GPS equipment, and/or the near-field pressure data.

9. The method of claim 1, further comprising:
    filtering the near-field data acquired by each sensor to compensate for individual characteristics thereof, wherein the individual characteristics include at least one of amplitude and phase.

10. A marine source array evaluation apparatus configured to analyze data related to a marine source array including individual pressure wave sources configured to generate waves underwater, and sensors associated with the individual wave sources configured to acquire near-field data related to the waves generated by the individual wave sources, the sensors being placed near of the individual wave sources, the apparatus comprising:
    a near-field data processing unit configured
        to calculate an index for each of the individual wave sources based on (A) the near-field data and (B) information on geometry of the marine source array that enables localizing (i) the individual wave sources and (ii) respective sensors relative to one another; and
        to compare the index for each of the individual wave sources with a corresponding reference index for determining whether a fault has occurred;
    wherein the index comprises a spectrum and at least one of an arrival time of a first peak, a phase, a peak-to-bubble ratio and a bubble period.

11. The apparatus of claim 10, wherein the sensors are hydrophones.

12. The apparatus of claim 10, wherein the individual wave sources are air guns or clusters of air guns and the near-field data processing unit is configured to generate the index by determining an equivalent notional signature for each of the individual wave sources; and extracting the index based on an inverse of the equivalent notional signature.

13. The apparatus of claim 12, wherein the near-field data processing unit uses one or more of the following assumptions for determining the equivalent notional signature for each of the individual wave sources:

each of the individual pressure wave sources has an equivalent notional signature that propagates spherically;

equivalent notional signatures of air guns in a cluster are identical;

a notional signature of a pressure wave source that is not firing is null; and a reflection coefficient of a pressure wave at a water surface is a function of an incident angle, the function being measured and calculated during a bubble test.

14. The apparatus of claim 10, wherein the near-field data processing unit is further configured to obtain the information on the geometry of the marine source is from acoustic equipment, GPS equipment, and/or based the near-field pressure data.

15. The apparatus of claim 10, wherein the near-field data processing unit is further configured to filter data associated to each of the pressure sensors in order to compensate for the pressure sensors having different characteristics, wherein the different characteristics include at least one of amplitude and phase.

16. The apparatus of claim 10, wherein the individual pressure wave sources are air guns or clusters of air guns, and the near-field data processing unit is configured to generate the index for each of the individual pressure wave sources by (1) determining an equivalent notional signature for each of the individual pressure sources, and (2) extracting the index based on an inverse of the equivalent notional signature.

17. The apparatus of claim 10, wherein the index comprises the first peak, the spectrum, phase, the peak-to-bubble ratio, and the bubble period.

18. The apparatus of claim 10, further comprising:

a monitoring unit connected to the near-field data processing unit and configured to monitor evolution of the index for each of the individual sources and to signal when a difference between the generated index and the reference index exceeds a predetermined index threshold difference.

19. The apparatus of claim 10, further comprising:

a display connected to the near-field data processing unit and configured to display values of the index versus time for one or more of the individual.

20. A computer readable media non-transitorily storing executable codes which when executed on a computer make the computer perform a method for detecting individual source faults in a marine source array, the method comprising:

acquiring near-field data using sensors, the sensors being located near the individual wave sources;

generating an index for each of the individual wave sources based on (A) the near-field data and (B) information on geometry of the marine source array that enables localizing (i) the individual wave sources and (ii) respective sensors relative to one another; and comparing the index for each of the individual wave sources with a corresponding reference index for determining whether a fault has occurred, wherein the near-field data is acquired for individual wave sources using sensors, one of the sensors being placed near of each of the individual wave sources, the information on the geometry of the marine source enables localizing the individual wave sources and the sensors relative to one another; and wherein the index comprises a spectrum and at least one of an arrival time of a first peak, a phase, a peak-to-bubble ratio and a bubble period.

\* \* \* \* \*